United States Patent [19]
Imoto et al.

[11] Patent Number: 4,705,323
[45] Date of Patent: Nov. 10, 1987

[54] BRAKE CONTROL APPARATUS FOR VEHICLE

[75] Inventors: Yuzo Imoto, Kariya; Toshihiro Takei, Okazaki; Yoshiyuki Hattori, Toyoake; Haruhiko Uno, Anjo; Mitsuo Inagaki, Okazaki; Kenji Takeda, Aichi, all of Japan

[73] Assignees: Nippondenso Co., Ltd., Kariya; Nippon Soken, Inc., Nishio, both of Japan

[21] Appl. No.: 873,385

[22] Filed: Jun. 12, 1986

[30] Foreign Application Priority Data

Jun. 14, 1985 [JP] Japan ................................ 60-128032
Jun. 14, 1985 [JP] Japan ................................ 60-128033
Jun. 14, 1985 [JP] Japan ................................ 60-128034

[51] Int. Cl.$^4$ .......................... F16D 55/08; B60T 8/02
[52] U.S. Cl. .................................. 303/116; 188/72.1; 188/72.4; 310/328; 303/119
[58] Field of Search ............... 303/113, 114, 115, 116, 303/118, 119; 310/328; 188/72.1, 72.4

[56] References Cited

U.S. PATENT DOCUMENTS 4,553,059 11/1985 Abe et al. .......................... 310/328
4,623,044 11/1986 Ohto et al. .......................... 188/72.1
4,629,039 12/1986 Imoto et al. .......................... 303/119

FOREIGN PATENT DOCUMENTS

0033157  2/1985  Japan ................................ 303/116
60-139927 7/1985 Japan .
60-139928 7/1985 Japan .

Primary Examiner—Duane A. Reger
Assistant Examiner—Matthew C. Graham
Attorney, Agent, or Firm—Cushman, Darby & Cushman

[57] ABSTRACT

Wheel cylinders supplied with oil pressure from a master cylinder are respectively provided in brake mechanism provided in wheels of a vehicle. The wheel cylinder has a brake piston provided to form a first fluid chamber to supply oil pressure from the master cylinder, and a brake piston driven by the oil pressure of the first fluid chamber. The wheel cylinder has a piston mechanism formed by laminating thin plate shaped piezoelectric elements, and the piston mechanism is controlled to be expanded or contracted by controlling the voltage applied to the piezoelectric elements to vary the volume of the first fluid chamber. Cut-off valves are provided in passages for supplying the oil pressure from the master cylinder to the wheel cylinders, a check valve for allowing only the work oil to flow from the master cylinder to the wheel cylinder in parallel with the cut-off valve to control to expand the piston in the state the oil pressure is generated from the master cylinder and the cut-off valve is closed to control to further strengthen the oil pressure in the first fluid chamber.

13 Claims, 8 Drawing Figures

FROM MASTER CYLINDER
FROM CUT-OFF VALVE

FIG. 8

BRAKE CONTROL APPARATUS FOR VEHICLE

BACKGROUND OF THE INVENTION

The present invention relates to a brake control apparatus used for a vehicle such as an automobile and more particularly, to a brake control apparatus for controlling a boost to the depressing force on a brake pedal. It further relates to a brake control apparatus for controlling brake forces of individual wheels such as in skid controls.

In conventionally operating brakes on wheels of an automobile, brake devices generally use oil pressure. In other words, the brake device has a master cylinder for generating oil pressure by means of the depression of a brake pedal. Oil pressure generated by the master cylinder is distributed from the master cylinder to a brake mechanism provided for each respective wheel. Brake pistons are respectively provided in the wheel cylinders, the pistons are driven in response to the hydraulic oil supplied from the master cylinder, and the wheels are respectively acted by the brake forces of brake pads driven by the pistons.

In this case, the operating force of the brake pedal is converted directly into oil pressure with which drives the piston in the wheel cylinder by means of the oil pressure. However, in order to effectively utilize the depressing force acted on the pedal, a booster is used. The booster mechanism is constructed such that it increases the oil pressure by a predetermined ratio over the oil pressure in the case that only the depressing force of the brake pedal is converted directly into oil pressure for the piston in the wheel cylinder.

With such booster mechanism, a more than sufficient brake force can be obtained for a good road stability. However, this booster mechanism is activated by a higher oil pressure so as to produce a stronger braking force. Thus, a hydraulic circuit from the master cylinder to the wheel cylinders requires high pressure lines. Further, in order to accrue brake forces of the same degree to the wheels during turning such as front and rear wheels or inner and outer wheels are under different conditions, a special load regulating means such as proportional valves is required.

SUMMARY OF THE INVENTION

It is an object of the present invention to provide a brake control apparatus for a vehicle which can effectively provide boosted brake forces by means of generated oil pressure with the operation of a brake pedal without a complicated lines construction from the master cylinder to the wheel cylinders of a brake mechanism provided in the respective wheels.

It is another object of the present invention to provide a brake control apparatus for a vehicle which can independently control brake forces for wheels to effectively prevent a skid phenomenon. If a skid occurs, thereby it can reliably obtain a stable traveling state for the vehicle.

It is still another object of the invention to provide a brake control apparatus for a vehicle which can electronically control brake forces on the wheels by the depressing force of a brake pedal boosted at the ratio specified thus stably controlling the booster.

More specifically, in a brake control apparatus according to the present invention, a fluid pressure is generated with the operation of a brake pedal wherein a master cylinder supplies brake fluid to fluid chambers in the wheel cylinders of the brake mechanisms provided for each respective wheel, and cut-off valves are respectively provided in the lines to the wheels cylinders. Piston mechanisms composed of piezo elements are contracted or expanded by controlling applied voltages which are respectively provided in the wheel cylinders, and the volume of the fluid chambers of the wheel cylinders is variably controlled by the piston mechanism. The brake pistons are driven by the fluid pressure generated in the fluid chambers, brake forces are acted on the wheels by the operation of the brake pistons, and check valves for allowing only work fluids to flow from the master cylinder toward the wheel cylinders are provided in parallel with the cut-off valves.

The cut-off valves are ordinarily set in open state, and closed when a brake pedal is depressed so that the fluid pressure of the master cylinder is raised to the specified state. The fluid pressure of the master cylinder is supplied only through the check valve to the wheel cylinder. Since the cut-off valves are closed in this state, when a piezo piston mechanism is controlled to be expanded, the pressure in the fluid chamber is increased in response to the expanded distance of the piston mechanism. Thus, the brake forces acted to the respective wheels are set by controlling voltages applied to piezoelectric elements of the piston mechanisms to electronically control to boost the brake forces. If a slip occurs at the wheel in a state where the brake force is being acted, the piston mechanism of the wheel cylinder of the brake mechanism in the wheel in which a slip occurs is controlled so as to contract, and the brake force acted at the wheel is decreased thus performing a skid control, thereby stably controlling the traveling state of the wheels. In other words, the brake forces of the wheels can be independently controlled by electronically controlling the piston mechanisms composed of piezoelectric elements thereby simplifying the construction of the fluid passages between the master cylinder and the wheel cylinders for not only boost control of the brake forces but anti-skid control without utilizing high pressure lines.

DETAILED DESCRIPTION OF THE PREFERRED EMBODIMENTS

Figure 1:
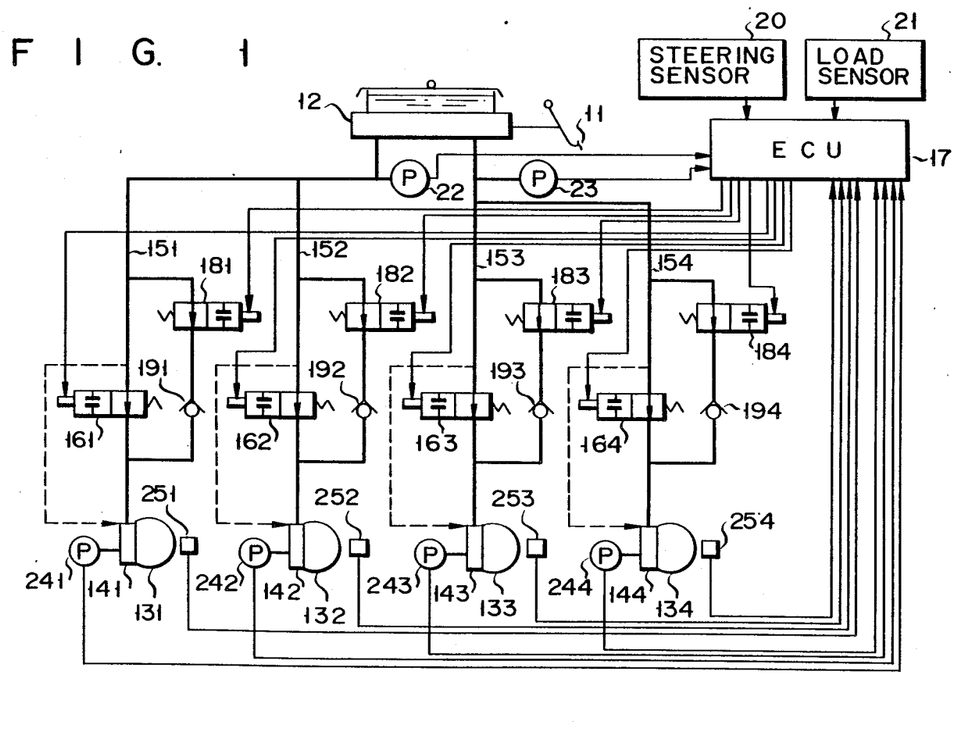
FIG. 1 is a hydraulic circuit diagram for explaining the construction of an embodiment of the brake control apparatus for a vehicle according to the present invention.

FIG. 1 shows a brake control apparatus for a vehicle according to the present invention. A brake command is generated by depressing brake pedal 11. Pedal 11 drives a piston mechanism of master cylinder 12 by the depression, and oil pressure corresponding to the depressing force of pedal 11 is generated by cylinder 12. The oil pressure generated by cylinder 12 is supplied through conduits 151 to 154 to brake mechanisms 141 to 144 respectively provided for front and rear wheels 131 to 134.

Cut-off valves 161 to 164 are respectively provided in conduits 151 to 154 to be controlled to open or close by a command from an electronic control unit 17. Unit 17 may be constructed by a unit for controlling an engine composed of, for example, a microcomputer.

Switch valves 181 to 184 for forming oil pressure passages are respectively connected in parallel to valves 161 to 164. Check valves 191 to 194 are connected in series to valves 181 to 184. Check valves 191 to 194 are constructed to allow only the work oils to flow from master cylinder 11 toward brake mechanisms 141 to 144. Valves 181 to 184 are controlled to switch by a command from unit 17.

Unit 17 is constructed to input various detection signals such as a steering signal from steering sensor 20 for controlling a brake, a detection signal from load sensor 21 for a road surface or a vehicle, and detection signals from oil pressure sensors 22 and 23 for detecting pressure oils supplied from cylinder 12 to front and rear wheels.

Oil pressure sensors 241 to 244 for detecting oil pressure in the wheel cylinders for forming brake mechanism 141 to 144 for wheels 131 to 134 are respectively provided in brake mechanisms 141 to 144. Wheel rotating speed sensors 251 to 254 for measuring and detecting the rotating speeds of wheels 131 to 134 are provided in wheels 131 to 134. Detection signals from sensors 241 to 244 and 251 to 254 are supplied as control input information to unit 17.

Unit 17 compares oil pressure generated from cylinder 12 with oil pressures set by brake mechanism 141 to 144 to control for setting adequate brake forces. Unit 17, for example, instructs a brake force control to smoothly turn, and, more particularly, acts on brakes on the inside wheels.

Figure 2:
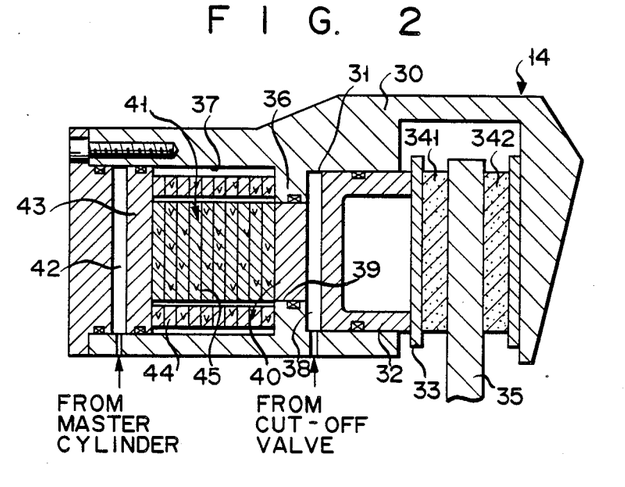
FIG. 2 is a sectional view showing the construction of one brake mechanism provided for each wheel used in the brake control apparatus.

FIG. 2 shows the above-mentioned brake control system in which one 14 of brake mechanisms 141 to 144 for wheels are representatively illustrated, and mechanism 141 to 141 are similarly constructed.

Brake mechanism 14 is constructed in brake caliper 30 provided in the vicinity of the wheel, and a wheel cylinder 31 is formed in caliper 30. Brake piston 32 is inserted into cylinder 31 to drive brake pad 341 through plate 33. Pad 341 is opposed to other fixed brake pad 342, and brake disk 35 integrally rotating with a wheel (not shown) is interposed between pads 341 and 342. A brake force is acted on disk 35 in the state that pad 341 is moved toward disk 35 by piston 32.

Partition wall 36 is formed at the surface opposed to the operating surface of piston 32 of cylinder 31, control cylinder 37 is formed coaxially with cylinder 31 through partition wall 36, and first oil chamber 38 is formed between wall 36 and piston 32. Cylinder bore 39 is formed in wall 36 between first oil chamber 38 and control cylinder 37, and piston member 40 is engaged within bore 39. Member 40 is movably provided in bore 39, and the oil pressure in chamber 38 is variably controlled by the movement of member 40.

Piezo piston mechanism 41 is provided in cylinder 37, and constructed to interpose a plurality of piezoelectric element group between a reference substrate 43 for partitioning second oil chamber 42 and member 40 in cylinder bore 39.

More particularly, first piezoelectric element group 44 formed in a cylindrical shape in which a plurality of piezoelectric elements formed in thin plate and ring shape are laminated are interposed between wall 36 and substrate 43, second columnar piezoelectric element group 45 in which a plurality of piezoelectric elements are laminated in a thin disk shape are interposed between substrate 43 and member 40. An interval between wall 36 and substrate 43 is provided by first group 44 to set the position of substrate 43, and an interval between substrate 43 and member 40 is set by group 45. The relative positions of members 40 is set by groups 44 and 45.

A plurality of piezoelectric elements for forming groups 44 and 45 are respectively laminated through electrode plates, and elements are electrically connected in parallel by groups 44 and 45. Voltages applied to group units 44 and 45 are controlled to control to expand or contract the groups 44 and 45 by controlling the applied voltages.

Oil pressure from master cylinder 12 is supplied through one of cut-off valves 161 to 164 to chamber 38 formed in wheel cylinder 31 opposed to piston member 40 for forming brake mechanism 41, and oil pressure generated from cylinder 12 is supplied to second oil chamber 42 formed in control cylinder 37 to operate as back pressure of substrate 43.

Since an area of the operating surface of substrate 43 opposed to chamber 42 is sufficiently larger than that of the operating surface of piston member 40 opposed to chamber 38 in this case, member 40 is driven with the position of substrate 43 as a reference in response to the expansion or contraction of mechanism 41. Thus, pressure of chamber 38 is controlled to control the movement of brake piston 32.

Figure 3:
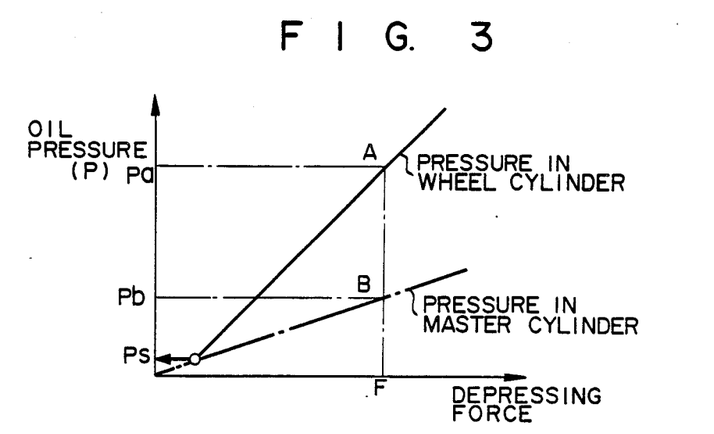
FIG. 3 is a view for explaining the relation between the depressing force and the generated oil pressure in the brake control apparatus.

In the brake control apparatus thus constructed as described above, when pedal 11 is depressed, the oil pressure generated from master cylinder 12 rises as designated by a chain line in FIG. 3. The oil pressure generated from master cylinder 12 is detected by sensors 22 and 23. When the detected pressure arrives at specified set value Ps, unit 17 generates a command for closing valves 161 to 164. Then, the control of piezo piston mechanism 41 of brake mechanisms 141 to 144 respectively provided in wheels 131 to 134 is started.

Figure 4:
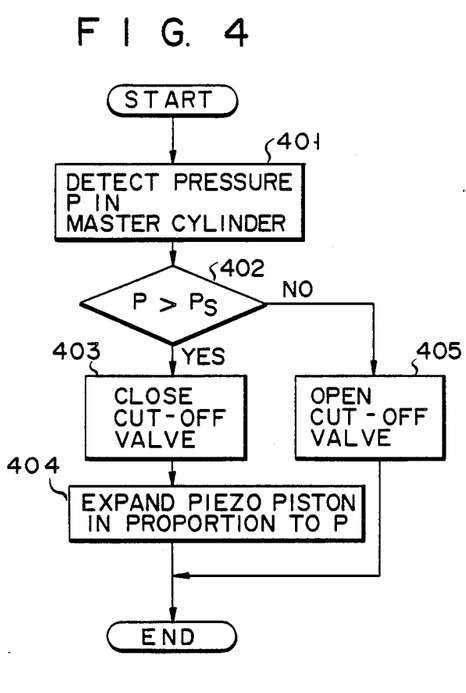
FIGS. 4 and 5 are flow charts for explaining the flow of control of the brake control apparatus.

FIG. 4 shows the state of the flow of the brake control in this unit 17. In step 401, oil pressure P generated from master cylinder 12 is detected. In step 402, the detected pressure P is compared with set pressure Ps, and the control is advanced to step 403 when it is judged that P is larger than Ps. In step 403, cut-off valves 161 to 164 are closed, and brake mechanism 41 set in response to the wheel cylinders are controlled to be expanded in proportion to pressure p. In other words, in mechanism 41, the voltage applied to piezoelectric element group 44 is decreased for contract group 44, and the voltage applied to piezoelectric element group 45 is raised for expand group 45, piston member 40 is moved toward first oil chamber 38 to control to raise the oil pressure in chamber 38. In other words, brake piston 32 is driven in response to the pressure of first oil chamber 38 to generate a brake force corresponding to the oil pressure.

The control state of brake mechanism 41 is decided by the relation between the detected values detected by sensors 22, 23 and the detected values from sensors 241 to 244 of the wheel cylinders provided for the respective wheels. More specifically, pedal 11 is depressed by a depressing force F, when oil pressure shown by Pb at a point B in FIG. 3 is generated in master cylinder 12, brake mechanism 41 is so controlled as to execute the depressing force boost control at a predetermined ratio so that the oil pressure set by the wheel cylinder may become Pa designated at a point A in FIG. 3.

More particularly, when pedal 11 is depressed, a brake operation is performed in the state where the depressing force is strengthened. In this case, the oil pressure set in first oil chamber 38 of wheel cylinder 31 is set by cut-off valves 161 to 164 and brake mechanisms 141 to 144 of wheels 131 to 134, and high oil pressure is set at caliper 30 for forming mechanisms 141 to 144. Accordingly, the line structure for work oil from master cylinder 12 can be sufficiently simplified. The brake forces in the brake mechanism are controlled in response to the circumstances by high speed response of the piezoelectric elements.

In this case, since the brake forces of wheels 131 to 134 are controlled by values detected by sensors 241 to 244 set in brake mechanisms 141 to 144 as a reference, the brake forces of wheels 131 to 134 are set in an optimum balanced state. Brake force control for the respective wheels responsive to the traveling state of the vehicle also can be performed on the basis of a detection signal from steering sensor 20 and a detection signals from road surface and vehicle load sensor 21 thereby effectively controlling the stability of the vehicle.

When brake pedal 11 is released and oil pressure P detected by sensors 22 and 23 becomes lower than set value Ps, the control is advanced to step 405 in FIG. 4, and cut-off valves 161 to 164 are opened. The work oils in wheel cylinders 31 of brake mechanism 141 to 144 are returned through cut-off valves 161 to 164 toward master cylinder 12 to reduce the oil pressure of first oil chamber 38, thereby removing the brake forces operated on the wheels.

Switch valves 181 to 184 are opened in the above-mentioned ordinary brake state.

If wheel 131, for example, slips when pedal 11 is depressed to perform the brake operation as described above, the slip state is detected by the variation in the detection signal from wheel speed detection sensor 251. In other words, if a slip occurs in wheel 131, the wheel becomes in a locked state thus causing the rotating speed to abruptly decrease.

Figure 5:
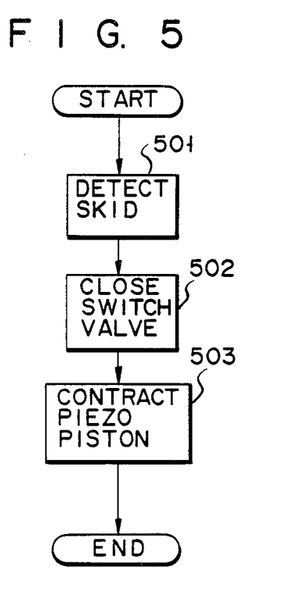

FIG. 5 shows the flow of the brake control in case that this skid state occurs. In step 501, the skid state of the wheel is detected as described above. In step 501, when the skid is detected, switch valve 181 of the passage of brake mechanism 141 for the wheel 131 in which the skid occurs is closed in step 502.

More particularly, even if the oil pressure in master cylinder 12 rises, no oil pressure is supplied from master cylinder 12 to brake mechanism 141 of the wheel in which the skid occurs. The control is advanced to step 503 in this state, and brake mechanism 41 is controlled to reduce the oil pressure in first oil chamber 38. In other words, the voltage applied to peizoelectric element group 44 is raised in brake mechanism 41, and the voltage applied to piezoelectric element group 45 is set to a lower value.

More specifically, the brake mechanism for operating a brake force at the wheel in which the skid occurs is controlled to decrease the brake force, and the lock state of the slipped wheel is rapidly released to eliminate the skid phenomenon.

In the embodiment described above, the switch valves are provided in series with switch valves 181 to 184 in parallel with cut-off valves 161 to 164. However, the switch valves may be omitted as shown in FIG. 6.

In other words, the booster control of the brake force described with respect to the above-mentioned embodiment can be performed by cut-off valves 161 to 164 and switch valves 181 to 184. When the operation for reducing the boost force is executed by the piezo piston mechanism at the braking time, an anti-skid control for reducing the brake force operated for the specified wheel can be performed.

Figure 6:
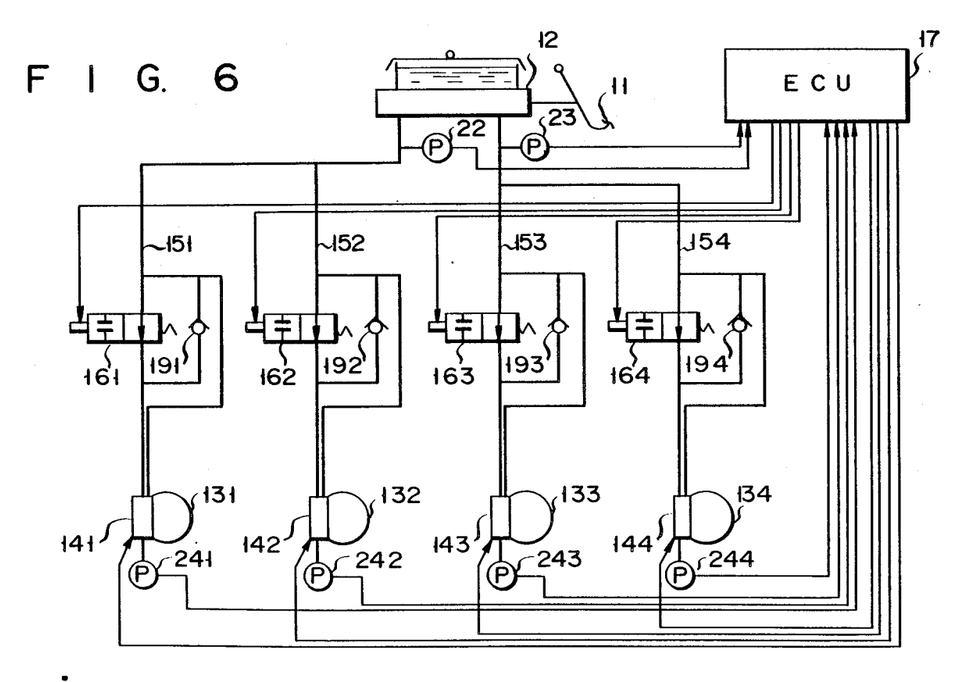
FIG. 6 is a view for explaining the construction of a second embodiment of a brake control apparatus for a vehicle according to the present invention.

In FIG. 6, an oil pressure passage for supplying the oil pressure from cylinder 12 to chamber 42 of mechanism 14 shown in FIG. 2, though omitted in FIG. 1, is illustrated.

In the brake control apparatus described in the embodiment as above, the pressures of the first oil pressure chambers provided in the wheel cylinders of the brake mechanisms provided for the respective wheels are directly controlled by the piezo piston mechanism to control to drive the brake pistons by the pressures of the first oil pressure chambers. Accordingly, in order to more effectively perform the brake force booster control and further the anti-skid control, it is required to stably set the volume of the first oil chamber 38 provided in wheel cylinder 31.

However, if pads 341 and 342 contacted with brake disk 35 at the braking time are worn, and particularly, if pad 341 is worn, brake piston 32 is moved toward pad 341 in the worn amount to expand the volume of first oil chamber 38. In fact, the volume of first oil chamber 38 is varied to approx. ten times in an extreme case from the relation between the thickness of the brake pad in the worn amount and the volume of the first oil pressure chamber provided in the wheel cylinder. Therefore, if the volume of the first oil chamber 38 is varied at this rate, the oil pressure control characteristic is affected, and it might sometimes become difficult to smoothly execute the brake force control in accuracy and in high speed response.

Figure 7:
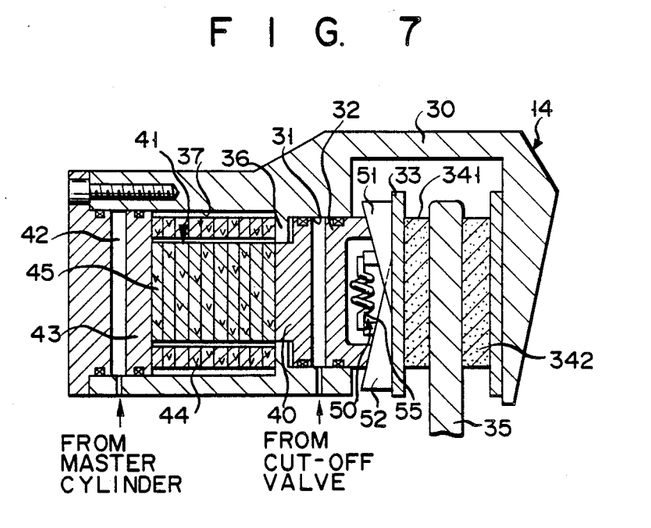
FIG. 7 is a sectional view showing another example of a brake mechanism provided for each wheel.

FIG. 7 shows an example of brake mechanism 14 composed to solve the above-mentioned problem, and illustrating fundamentally the same brake mechanism as in FIG. 2.

In this brake mechanism, the coupling portion of brake piston 32 with brake pad 341 is particularly improved, and spacer mechanism 50 is interposed between plate 33 mounted with pad 341 and piston 32.

Spacer mechanism 50 has first and second spacer members 51 and 52, which are both formed in a wedge shape, and brake piston 32 is contacted with one oblique surface. Other oblique surfaces different from the oblique surfaces of spacer members 51 and 52 contacted with brake piston 32 are mounted on plate 33.

Figure 8:
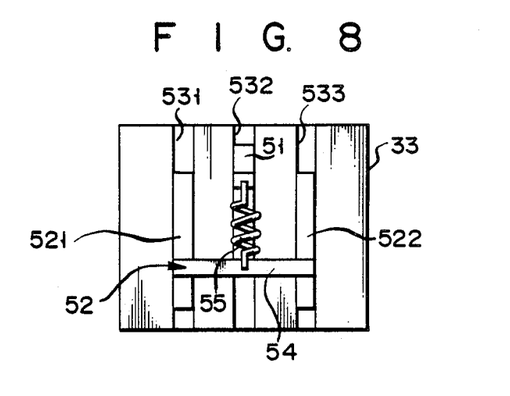
FIG. 8 is a view for explaining a spacer mechanism of a frame for supporting a brake pad of the brake mechanism.

FIG. 8 shows the contacting portion of plate 33 mounted in spacer mechanism 50 with brake piston 32. Three guide rails 531 to 533 of groove shape are formed, for example, in parallel with the surface of plate 33 opposed to piston 32. Spacer member 51 is engaged with guide rail 532 disposed at the center, and mounted movably along guide rail 532.

A pair of spacer members 521 and 522 for forming second spacer member 50 are engaged with guide rails 531 and 522 at both sides, and spacer members 521 and 522 are integrally coupled by coupling member 54. In other words, spacer member 52 composed of members 521 and 522 is provided movably along guide rails 531 and 533.

The oblique surfaces of spacer members 51 and 52 contacted with piston 32 are provided toward reverse directions to each other, and so coupled as to attract by spring 55. In this case, the oblique surfaces contacted with brake piston 32 are provided to be opposed to each other, and if spacer members 51 and 52 are attracted by spring 55, an interval between plate 33 and brake piston 32 is increased.

In addition, the same parts as those in FIG. 2 are designated by the same reference numerals so a detailed description will be omitted. In this embodiment, piston member 40 for forming piezo piston mechanism 41 is formed in the state contacted with the inner peripheral surface of wheel cylinder 31 in first oil chamber 38, and engaged within bore 39 formed in wall 36 toward control cylinder 37.

In the brake mechanism thus constructed as described above, if pads 341 and 342 are worn thin, the stroke of piston 32 for operating brake disc 35 with the same force is increased as compared with the case of pads 341 and 342 which are not worn. Therefore, brake characteristic causes a difference according to the degree of wear on the pads 341 and 342. Particularly, when the anti-skid control is executed, the above difference of the braking characteristic directly affects the skid-control characteristic.

However, when space mechanism 50 is interposed between brake piston 32 and plate 33 as described above, pads 341 and 342 are worn so that an interval between pad 341 and disk 35 increases to larger than the original interval. Then, when the braking operation is released to return brake piston 32, the pressure of brake piston 32 for operating plate 33 become low. Therefore, spacer members 51 and 52 are attracted to each other by spring 55 in this state to increase the interval between brake piston 32 and plate 33. Then, the operating stroke of brake piston 32 is maintained constant.

In other words, worn amounts of pads 341 and 342 are compensated by the spacer mechanism to maintain the volume of the first oil pressure chamber 38 provided in wheel cylinder 31 at the original value, thereby stably providing brake control characteristic.

What is claimed is:

1. A brake control apparatus for a vehicle, comprising:

wheel cylinders respectively formed at brake calipers for wheels, brake pistons respectively movably provided in said wheel cylinders, each having a first fluid chamber partitioned in said wheel cylinder so that said brake piston is driven in response to the pressure of the fluid chamber to operate a brake force at the wheel corresponding to a brake pad driven integrally with said brake piston, piston mechanisms formed of a plurality of piezoelectric elements, each provided in a control cylinder formed adjacent to said wheel cylinder to control to expand or contract said piston mechanism in response to a voltage applied to said piezoelectric elements to variably control the pressure of the first fluid chamber in said wheel cylinder, a master cylinder for generating fluid pressure responsive to the braking operation to operate the fluid pressure to the first fluid chamber through a fluid passage, cut-off valves, each provided in said fluid passage to partition the first fluid chamber of said wheel cylinder from said master cylinder in closed state to maintain the volume of the fluid chamber constant, check valve mechanism, each provided in parallel with said cut-off valve and set to allow only the fluid to flow from said master cylinder to said wheel cylinder, and control means having means for detecting fluid pressure generated from said master cylinder for closing said cut-off valves in the state the fluid pressure generated from said master cylinder becomes a predetermined level or higher to control a voltage applied to the piezoelectric elements of said piston mechanism so as to control the pressure of the first fluid chamber of said wheel cylinder.

2. An apparatus according to claim 1, further comprising:

pressure sensors respectively provided in said wheel cylinders for wheels for detecting the pressures of the first fluid chambers in said wheel cylinders to supply detection signals therefrom to said control means, thereby controlling to expand said piston mechanism so that the pressure of said first fluid chamber is set to a pressure strengthened from the fluid pressure generated from said master cylinder.

3. An apparatus according to claim 1, further comprising:

switch valves, each provided in series with said check valve mechanism for closing the fluid passage of said check valve mechanism in the state said cut-off valve is closed to variably control the pressure of the first fluid chamber in said wheel cylinder only by said piston mechanism.

4. An apparatus according to claim 1, further comprising:

skid detecting means provided for wheels with said wheel cylinders, said control means closing said cut-off valve provided in the fluid passage for supplying fluid pressure from the master cylinder to the wheel cylinder of the wheel in which a skid occurs on the basis of a skid detection signal detected thereby to control to contract said piston mechanism provided in the wheel cylinder.

5. An apparatus according to claim 4, wherein said skid detecting means comprises rotating speed detecting means for detecting the rotating speeds of the respective wheels and supplying the detection signal from the rotating speed detecting means respectively provided at the wheels to said control means to detect an abrupt drop of the rotating speed of each wheel by said control means.

6. An apparatus according to claim 1, wherein said wheel cylinder is each formed in a brake caliper provided for each wheel, said brake piston is movably provided to partition the first fluid chamber in said wheel cylinder to control the control cylinder partitioned in said first fluid chamber to become coaxial with the wheel cylinder, and a piston member of said piezo piston mechanism provided in the control cylinder is inserted into a piston bore formed in partition wall between said first fluid chamber and the control cylinder.

7. An apparatus according to claim 6, wherein said piezo piston mechanism comprises a plurality of thin plate-shaped piezoelectric elements laminated to expand or contract in response to the voltage value applied to the elements, and said piston member is moved toward or in reverse direction to the first fluid chamber in response to the expansion or contraction state thereof.

8. An apparatus according to claim 6, wherein said piezo piston mechanism comprises a first piezoelectric element group formed by laminating a plurality of piezoelectric elements interposed between a reference substrate for partitioning the second fluid chamber in said control cylinder and the partition wall, and a second piezoelectric element group formed by laminating a plurality of piezoelectric elements interposed between said substrate and said piston member, and said second fluid chamber is provided with fluid pressure for pressing the substrate toward the partition wall.

9. An apparatus according to claim 8, wherein said second fluid chamber is supplied with fluid pressure from said master cylinder.

10. An apparatus according to claim 8, wherein said first piezoelectric element group is composed in a cylindrical shape by laminating a plurality of thin plate-shaped piezoelectric elements formed in a ring shape interposed between the periphery of the piston bore of said partition wall and said substrate, and said second piezoelectric element group composed in a columnar shape by laminating a plurality of thin disk shaped piezoelectric elements disposed in the central core of the cylindrical first piezoelectric element group interposed between said substrate and the piston member to set the reference position of said substrate on the basis of the expanded or contracted state of said first piezoelectric element group to set the length from the position of said substrate to the piston member in response to the expanded or contracted state of said second piezoelectric element group.

11. An apparatus according to claim 1, further comprising:
brake means driven by said brake piston, having a frame for pressing a brake pad on the brake disk when the pressure in the first fluid chamber in said wheel cylinder rises upon reception of a force from said brake piston, spacer means interposed between the frame and said brake piston for regulating the interval therebetween.

12. An apparatus according to claim 11, wherein said spacer means comprises first and second spacer members movably provided along a plurality of guide mechanism formed in parallel with the side of the brake piston of said frame, said first and second spacer members are formed in a wedge shape, the oblique surfaces thereof are formed along said guide mechanisms, the oblique surfaces thereof are provided to oppose each other by the first and second spacer members to operate the depressing force of the brake piston to the oblique surfaces of said first and second spacer members.

13. An apparatus according to claim 12, further comprising:
spring means provided at said first and second spacer members for energizing a force for moving said first and second spacer members in a direction for expanding the interval between said frame and said brake piston.

* * * * *